United States Patent [19]
Browning et al.

[11] Patent Number: 5,903,302
[45] Date of Patent: May 11, 1999

[54] AUTOMATED VIDEO CALL DISTRIBUTION

[75] Inventors: Jeffrey D. Browning, Boerne; James F. Franz, San Antonio; Eric F. Himmer, San Antonio; Lawrence M. White, San Antonio, all of Tex.

[73] Assignee: Datapoint Corporation, San Antonio, Tex.

[21] Appl. No.: 08/726,376

[22] Filed: Oct. 4, 1996

[51] Int. Cl.$^6$ .................................................. H04N 7/14
[52] U.S. Cl. ......................... 348/15; 379/93.26; 379/205
[58] Field of Search .......................... 379/93.21, 93.26, 379/202, 204, 205, 206; 348/14, 15, 16

[56] References Cited

U.S. PATENT DOCUMENTS

| | | | |
|---|---|---|---|
| 4,710,917 | 12/1987 | Tompkins et al. ...................... | 379/202 |
| 5,515,426 | 5/1996 | Yacenda ................................ | 379/88.01 |
| 5,555,017 | 9/1996 | Landante et al. ..................... | 348/15 |
| 5,598,209 | 1/1997 | Cortjens ................................ | 348/15 |
| 5,671,269 | 9/1997 | Egan et al. ............................ | 379/88 |
| 5,689,300 | 11/1997 | Shibata et al. ....................... | 348/15 |

*Primary Examiner*—Curtis A. Kuntz
*Assistant Examiner*—Melur Ramakrishnaiah
*Attorney, Agent, or Firm*—Cobrin & Gittes

[57] ABSTRACT

A video call distribution and method provides the user of a video station with access to a video network conferencing station without human operator assistance, even if the communication protocols of the user video station are incompatible with those of the video network conferencing system. Access is provided by remote user transmitted DTMF (or voice) signals, which signals are converted into compatible protocols in real time.

10 Claims, 12 Drawing Sheets

AUTOMATED VIDEO CALL DISTRIBUTION

INCLUSION OF COPYRIGHT NOTICE

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

BACKGROUND OF THE INVENTION

1. Field of the Invention

The invention relates generally to the field of video telecommunications. More specifically, the invention relates to a system which permits a video caller, without human operator assistance, to access any video station of a video network through conversion of dual tone modulated frequency ("DTMF") signals or through voice recognition software, even where the video network and the remote video station have incompatible communication protocols for communicating with each other.

2. Discussion of Related Art

DATAPOINT™ Corporation, assignee of the present invention, currently markets a video network conferencing system identified by the designation MINX™. The content of this system is incorporated herein by reference.

The MINX™ system is also described in U.S. Pat. Nos. 4,686,698; 4,176,585; 4,710,917; 4,847,829; and 5,014,267—all of which are also incorporated herein by reference.

U.S. Pat. No. 4,236,199, issued Aug. 17, 1993 to J. Thompson, Jr. and entitled INTERACTIVE MEDIA SYSTEM AND TELECOMPUTING METHOD USING TELEPHONE KEYPAD SIGNALLING, teaches remote access to actuate a video screen using DTMF conversion software, thereby avoiding the need for fully compatible video protocols. The content of this '199 patent is incorporated herein by reference.

U.S. Pat. No. 5,480,411, issued Jan. 30, 1996 to S. Lewis and entitled INTERACTIVE SYSTEM FOR A CLOSED CABLE NETWORK, teaches a method by which users of a video network, such as those found in hotel rooms, may gain access to remote users for interactive communications. The content of this '411 patent is also incorporated herein by reference.

None of these prior art teachings reveal how a remote user may—without human operator assistance—initiate access with any video station of a closed video network, unless the communication protocols are compatible between the remote user and the network. It would be desirable to provide such capability, and thereby eliminate the need for human operator intervention.

A conventional videoconferencing system comprises a camera, video monitor, microphone, speaker, and means to modify the associated electrical signals into a form which can be conveyed by an appropriate communications channel. The camera and microphone convert visual and aural information, respectively, into electronic signals which can be conveyed over the communication link. Likewise, at the receiving end, the electrical signals received from the communication link are converted back into visual and aural information by the video monitor and speaker, respectively. This represents a point-to-point (or "two-point") videoconferencing system.

The utility of such a system may be enhanced by providing support for "multi-way" calls, where three or more videoconferencing terminals may participate in a single call. There are two approaches to multi-way calling. In the first approach, all videoconferencing terminals at a given site attach to a local videoconferencing switch or network. The switch or network is capable of connecting local terminals in either a point-to-point configuration or in a multi-way configuration. Participants outside of the local area connect to the switch or network via a coder/decoder ("codec") that is attached to one of the switch's or network's ports. Such a switch or network includes LAN-based videoconferencing networks or frequency division multiplex ("FDM") architectures, where all terminals are on a common physical bus, so that dynamic channel switching is done to effect connections (which do not possess an identifiable physical switch).

In the second approach, all videoconferencing terminals possess a codec, and all participants in a multi-way call must place a call into a centralized device. This centralized device, typically called a multipoint control unit ("MCU"), receives the video/audio data streams from the various participants and switches or multiplexes the data streams as appropriate to establish the multi-way communication between sites.

Current MCU's typically operate in a "scheduled" mode. In this scheme, each remote participant places a call to a particular number, which represents a physical port on an MCU. By prior arrangement, those particular ports have been configured to be in a conference at the appointed time.

It is often desirable to allow the user to simply "dial-up" a multi-way conference without prior arrangement. To do this using an MCU, the user must first dial-up a call to a particular port on the MCU. The user then passes information to the MCU specifying which other MCU port he wishes to connect into the call.

Most current MCU's conform to an industry-wide set of standards which define various phases of MCU operation. These standards, specifically H.231 and H.243, describe in detail how the originating terminal, which is a codec, interacts with the MCU. Included in the H.243 standard is a defined method for the originating codec to pass "destination port" data to the MCU, enabling the user can set up a call without prior arrangement.

Unfortunately, current codecs and MCU's do not typically implement this part of the H.243 standard—i.e., the part that allows the user to set up the call. With current codecs, all connections through an MCU must typically be pre-arranged.

In the MINX™ system, all terminals are connected directly to a local video switch and, within the local network, users simply dial-up the terminal or terminals with whom they wish to converse. The system is easily extended to route long-distance calls through use of a local codec resource.

A problem arises when a "foreign" or remote codec has an incompatible communications protocol and calls into a codec connected to the local video switch or network. If the remote codec uses an incompatible communications protocol, then it has no means to pass a destination terminal number to the video switch or network. There is no means to determine which of the local terminals is the correct destination. In the past, this problem has been solved by passing such calls to a pre-defined terminal, designated the "operator." The operator determines the correct destination terminal, places a call to that terminal, then hangs up. This leaves the remote codec in a call with the appropriate destination terminal.

The "default operator" approach is somewhat clumsy, so an improved method for connecting foreign calls into a local video network is needed.

SUMMARY OF THE INVENTION

An aspect of the invention resides in an apparatus and method of determining whether a codec is capable of communicating destination terminal ID data with a video conferencing network, i.e., using compatible communication protocols, and, if not, connecting the codec with an automated operator.

In accordance with another aspect of the invention, an automated operator generates a visual prompt that the codec may respond to for identifying the desired destination terminal. The codec's response may be transmitted through DTMF signals or electrical signals corresponding to voice. Hence, there is no need for the control protocols (e.g., those used to identify the terminals) to be compatible.

BRIEF DESCRIPTION OF THE DRAWINGS

For a better understanding of the present invention, reference is made to the following description and accompanying drawings, while the scope of the invention is set forth in the appended claims.

FIGS. 4–8A, 8B, 9–10 are screen displays showing the prompts responsible for call routing to a desired video terminal of the video conferencing network in accordance with the automated operator of FIG. 3.

DESCRIPTION OF THE PREFERRED EMBODIMENT

Figure 1:
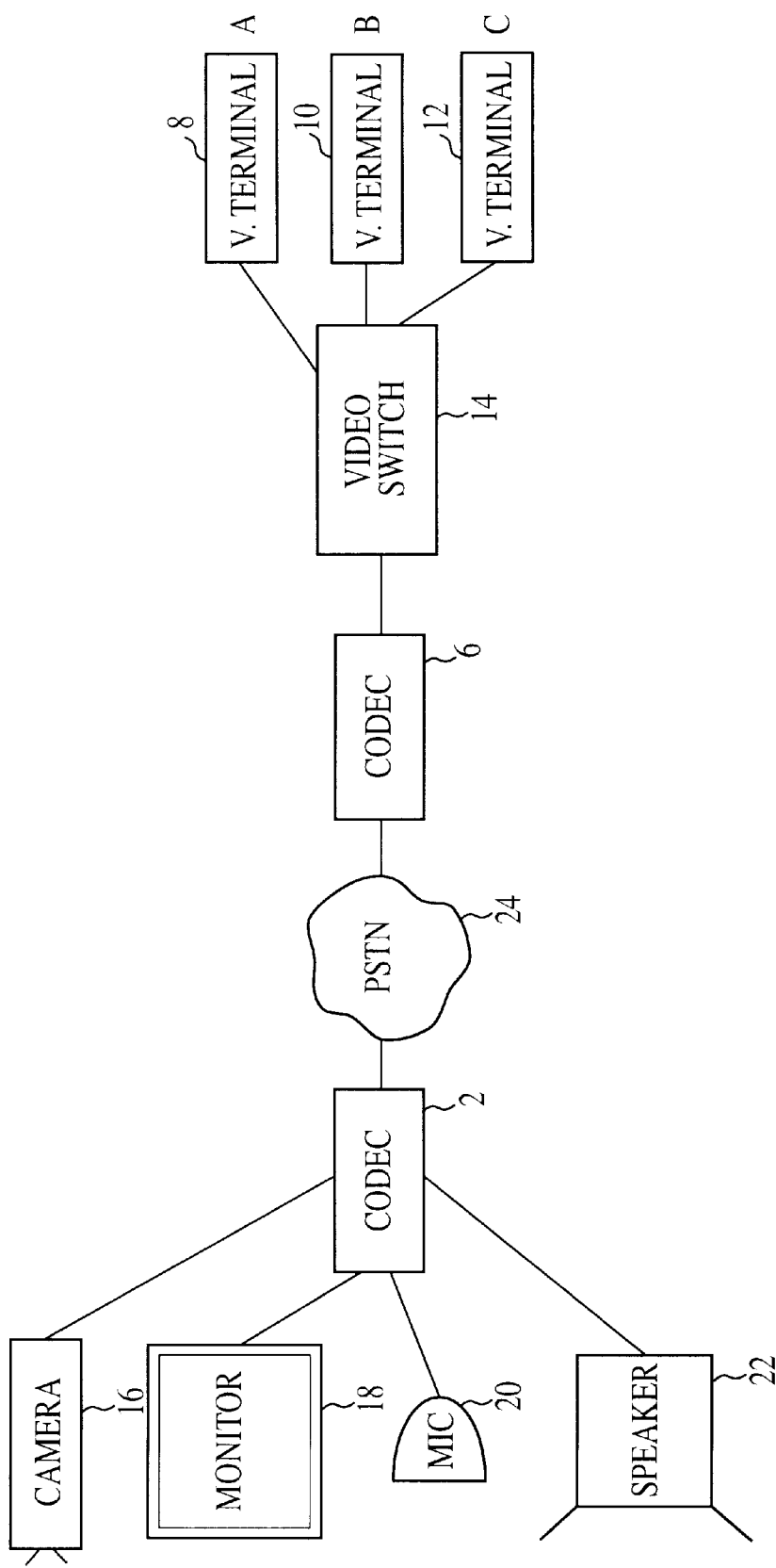
FIG. 1 is a schematic representation of a conventional DATAPOINT™ video conferencing system.

FIG. 1 depicts the overall Conventional Video Conferencing system. "Remote" codec 2, on the left side of the page, may lack the capability to pass routing information to a predefined terminal, network or video switch 14. As a result, a remote user will be able to place a call to the right-side codec 6, but will have no means of selecting a desired end terminal 8, 10, or 12. Such calls are passed to the pre-defined terminal, network or video switch 14 (henceforth referred to as video switch 14), which has been designated as the system operator. At this video switch 14, a person answers the call and forwards it as necessary.

The remote user may possess a camera 16, monitor 18, microphone 20 and speaker 22, all tied into the remote codec 2. Codec 6 connects to video switch 14, which, in turn, connects to video end terminals 8, 10 and 12. Codecs 2 and 6 communicate via a publicly switched telephone network ("PSTN") 24.

Figure 2:
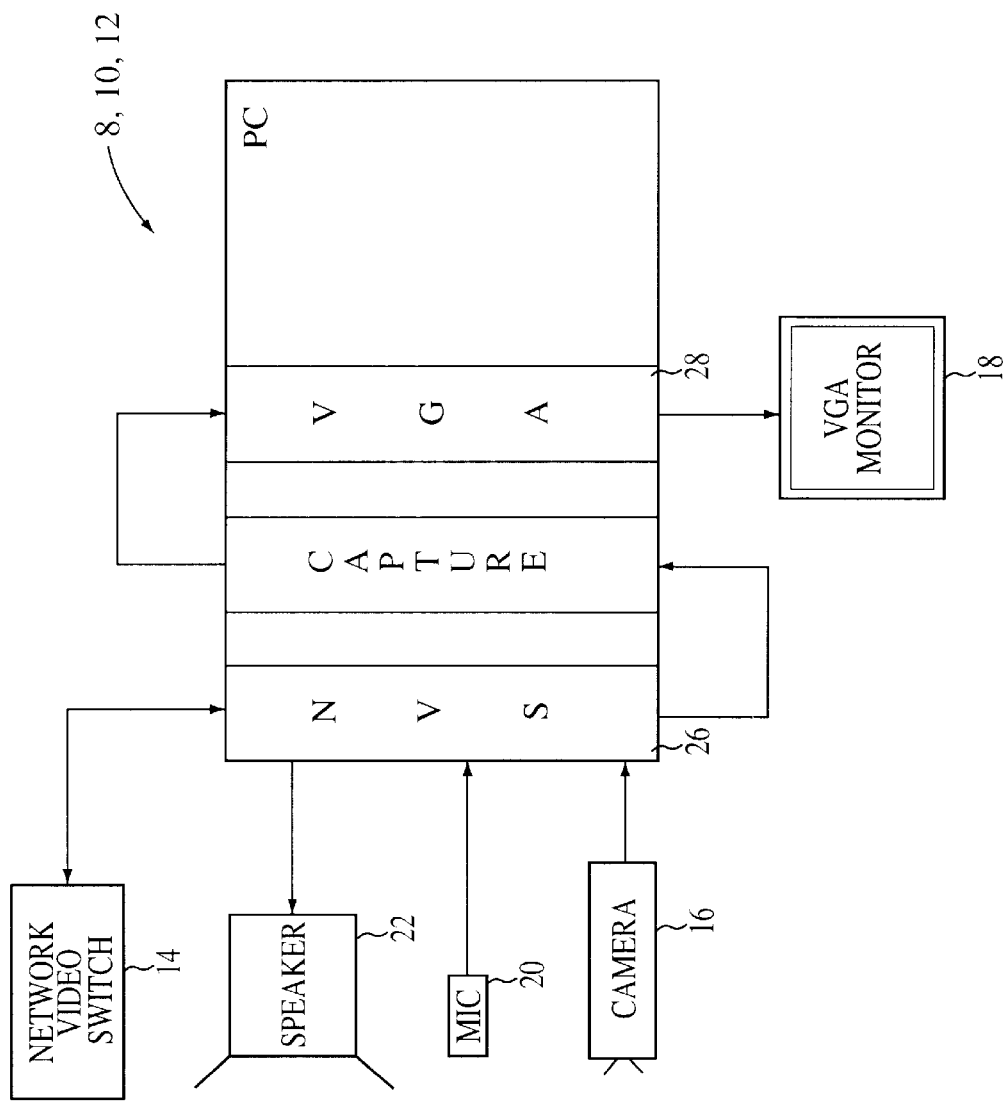
FIG. 2 is a schematic representation of a conventional video terminal.

FIG. 2 shows detail of one of the video end terminals 8, 10 and 12. The Network Video Switch ("NVS") corresponds to one of DATAPOINT™ "cluster servers", model codes 2032, 2050, 2064 or 2128. This switch operates in a centralized location, and all local terminals connect to it. On the user's desk, a personal computer ("PC") contains one of DATAPOINT™ NVS cards 26, which includes a connection to a network interface card in the cluster server 14. The NVS card also has connections for video in & out (camera 16), and audio in & out (speaker 22, microphone 20). In normal usage, the video output connects to a "Video Blaster" card, which, in turn, connects to a video graphic adapter ("VGA") card 28. This allows incoming video from the network to be "windowed" onto the user's VGA monitor display 18.

Figure 3:
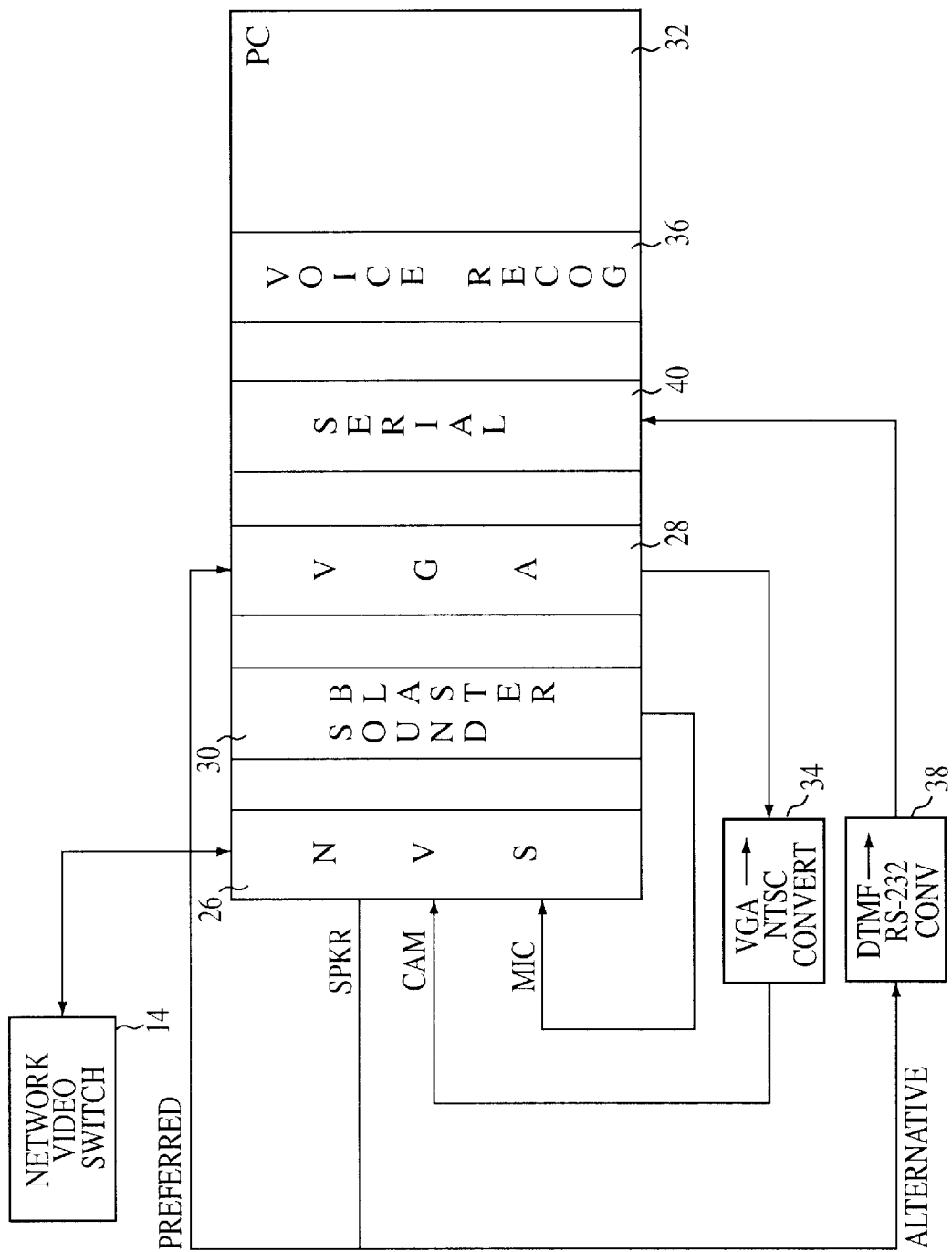
FIG. 3 is a schematic representation of an automated operator for a video conferencing system according to the present invention.

FIG. 3 describes the modification used to "automate" the operator function. A "Sound Blaster" style card 30 is added to the PC 32, and its output is connected to the "audio input" terminal of the NVS card 26. The PC's VGA card 28 output is converted to NTSC format using a commercially available converter 34. This NTSC video signal is connected to the "video input" terminal of the NVS card 26. The audio output from the NVS card 26 may be passed to a voice recognition device 36, which resides in the PC. Or, in an alternative embodiment, the Audio Output may be passed to a simple DTMF-to-RS232 converter 38, and the serial data output therefrom may be passed to the PC's serial data port 40. Those skilled in the art will appreciate that a wide variety of products/techniques are available to implement the "voice recognition" or DTMF-to-RS232 conversion functions, using hardware, software, or a combination thereof.

When remote codec 2 places a call to "local" codec 6 (attached to the video switch 14), the local codec automatically answers the call. Upon answering the call, the codecs establish a bi-directional audio and video path.

Local codec 6 then determines if remote codec 2 is capable of passing destination terminal ID data. If remote codec 2 is capable of passing such data, local codec 6 gets such data and completes the call to the destination terminal.

If, on the other hand, local codec 6 determines that remote codec 2 is not capable of passing destination ID data, local codec 6 connects the incoming call to video switch 14 (the automated operator). The automated operator contains a voice (or DTMF) recognition device 40, which monitors the incoming audio from remote codec 2. Following a prompt, the remote caller identifies to the automated operator the identity of the desired destination terminal 10, 12 or 14, either by ID number, name, or the like. The automated operator then places a call to the appropriate destination terminal 10, 12 or 14. When the terminal answers, the automated operator disconnects, leaving the remote caller in contact with the desired destination terminal.

For ease in understanding, the preceding discussion referred to the codec 2, user and user communication station as being remote. However, the present invention applies even in situations where the user is local instead of remote. For example, a local user might use this apparatus to look up someone's phone number (even if his workstation does have a fully compatible protocol). Or, the system might allow a non-compatible video station to connect to the network, locally. An example might be a conference room, equipped with cameras, speakers, etc, but no PC. It could be connected to a port on the switch or network, but have no means to dial a number.

In addition, the drawings show the use of a video switch. However, this switch may be replaced with a LAN-based videoconferencing network or frequency division multiplex architecture such that the terminals share a common physical bus and are thus responsive to a designation signal for a destination terminal to connect with the user communication station.

FIGS. 4–10 show the succession of video displays that prompt the remote user to pick the desired destination end terminal.

The following describes various aspects of a present implementation of the invention. This information is included for completeness, and is not intended to, in any way, define or limit the scope of the invention. The appendix contains a deposit of a computer program listing of software useful in implementing the present invention and generating the messages in the video displays of FIGS. 4–10.

Automated Video Call Distribution (AVCD)

DATAPOINT™ Automated Video Call Distribution System ("AVCD"), is a DTMF (Dual Tone Modulated Frequency) based call routing system under the mark designation MINX™. AVCD supports incoming video calls from any codec conforming to H261 or H320 standards in addition to other standards. These calls can be routed to any four digit station number (i.e. desktop, or conference room) in the DATAPOINT™ video network without operator assistance. If AVCD is unable to complete the connection to a station, the caller/client can redirect the call to a station identified as an "operator" for assistance.

Call routing can be accomplished by either entering the station number of the person or department desired, or by browsing a station name list. While browsing a station name list, the client has the option of using the dialer keypad to spell out a person or department name; AVCD will dynamically display only those names in the database which meet the entered spelling criteria. In other words, if the client keyed in "64", then AVCD will only display those names that begin with a "M", "N", or "O" followed by a "G", "H", or "I".

Installation

To install AVCD, use a Windows Program Manager, or equivalent, and execute the SETUP.EXE program. If AVCD is being installed on a network version of Windows where the SYSTEM director is write protected, add the IN option to the SETUP.EXE command line; for example: SETUP/N. This will copy all files destined for the windows SYSTEM director to the user's WINDOWS directory.

During installation, a default AVCD.INI configuration file is copied to the application directory. This fill should be examined using any text editor, such as the Windows NOTEPAD accessory application, to confirm or change to settings as appropriate for the site.

If, for whatever reason, the AVCD.INI file cannot be found, it will be recreated automatically by AVCD using programmed defaults, and placed into the same directory as AVCD.EXE.

Installation Summary

Install AVCD using the SETUP program.

Edit the AVCD.INI file to make any changes to the settings that may be required for the site.

Execute the AVCD_DB Database Maintenance application to create the database files if they currently do not exist. Setup will install a database with only one entry (Operator at station number 000) if the database does not exist.

Figure 4:
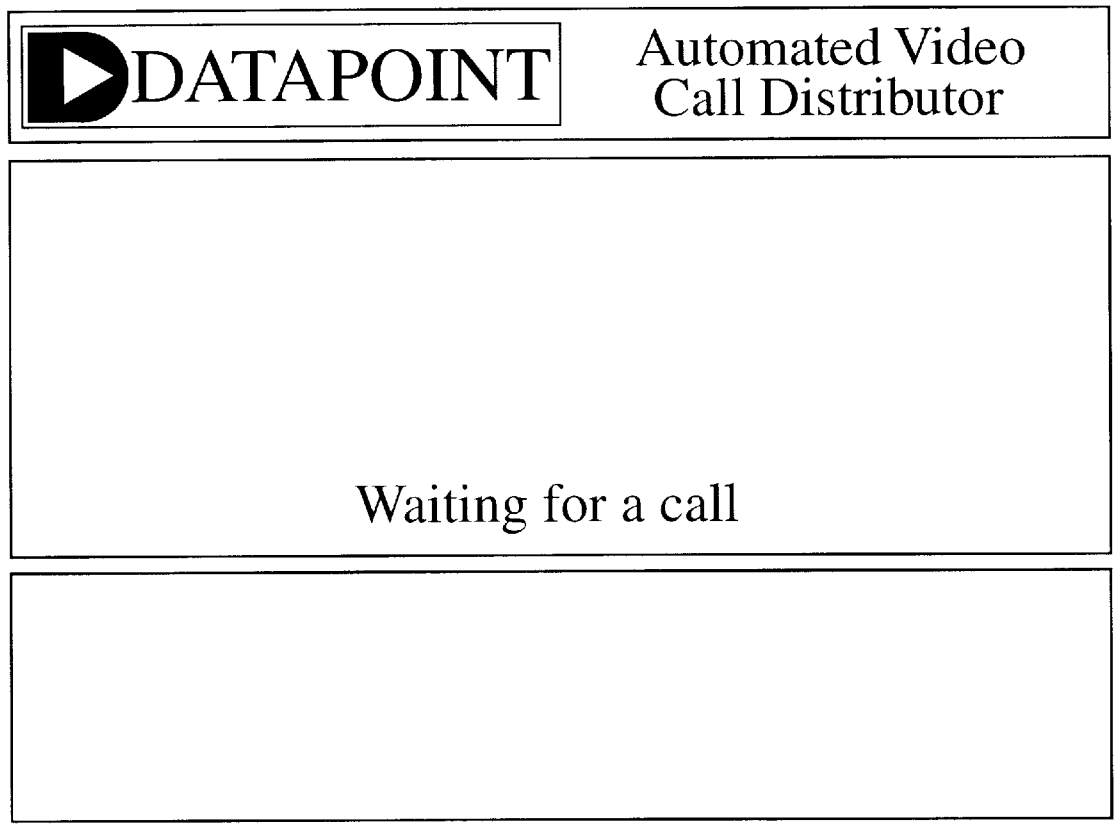

Host Operation (See FIG. 4)

AVCD is initialized by double clicking on the AVCD icon, or by using Windows File Run, and entering the location of AVCD.EXE. For example, if AVCD was installed into its default location, one would enter: C:\DATAPNT\AVCD\AVCD.EXE.

Once AVCD has initialized, it will display the message defined by the WaitingForCall keyword in the AVCD.INI file (e.g. "Waiting for a call" (See FIG. 4)). To terminate AVCD at this point, tap the ESC key, AVCD will respond with the message defined by the Shutdown keyword (e.g. "AVCD is shutting down . . . ") and will exit after closing PortMINX and DPTDTMF. If AVCD is terminated in any other manner, it is considered an abnormal termination, which may leave PortMINX, DPTDTMF, and Windows Multimedia in an undefined state; one should reboot your PC if this occurs. Note: DPTDTMF and Windows Multimedia are concerns only if using software DTMF detection (CommPort=O in the AVCD section of AVCD.INI).

Client Operation

A client has the option of entering station information in two different ways, either by station number (Station Number method) or by station name (Directory Lookup method). Data entry and navigation is performed using a 10 digit DTMF keypad (the * and # keys of a 12 key pad are not used because not all DTMF keypads have those two keys, or may not allow those tones to be passed on to AVCD). In each method, the "0" key is used to toggle between data entry and command mode. The command mode is especially useful in the station name entry screen, referred to as the directory lookup method, allowing a client to page or step through a directory of station names.

Station Number Method (See FIGS. 4–6, 8A)

When the call is answered by AVCD, a client will see and hear a welcome message followed by a display showing the station number entry screen. The command mode can only be entered when AVCD is asking for the first digit of a four digit station number. No station number should begin with a leading 0 because the command mode is toggled using the "0" key for the first digit. However, if a leading 0 is unavoidable as the first digit, one must key in "0" followed by a "9"; the "0" for the first digit of the station number causes the command mode to be invoked, and the "9" instructs AVCD to enter a "0" as the first digit and then return the client to data entry mode, saving the client from having to key an additional "0" to toggle back to data entry mode. For all other digits (2, 3, and 4), a "0" will be treated as a data entry "0", not a command mode toggle command.

Summary of commands in the command mode of Station Number Entry (all commands reference the database using numerical station number order). Note how the commands are positioned similar to the keypad on a PC keyboard (the upper left key is the HOME key, upper middle is the "cursor up" key, etc.) (See FIG. 8A):

1—Show first station number [Home]

7—Show last station number [End]

2—Show previous station number [Cursor Up]

8—Show next station number [Cursor Down]

4—Backup (Initiates a hangup) [Cursor Left]

6—Toggle data entry method (Initiates the Director Lookup method) [Cursor Right]

3—not used [Page Up]

9—Enter "0" as a digit of the station number, and return to data entry mode [Page Down]

0—Command mode toggle

5—Dials the selected station number

Figure 7:
Figure 8A:
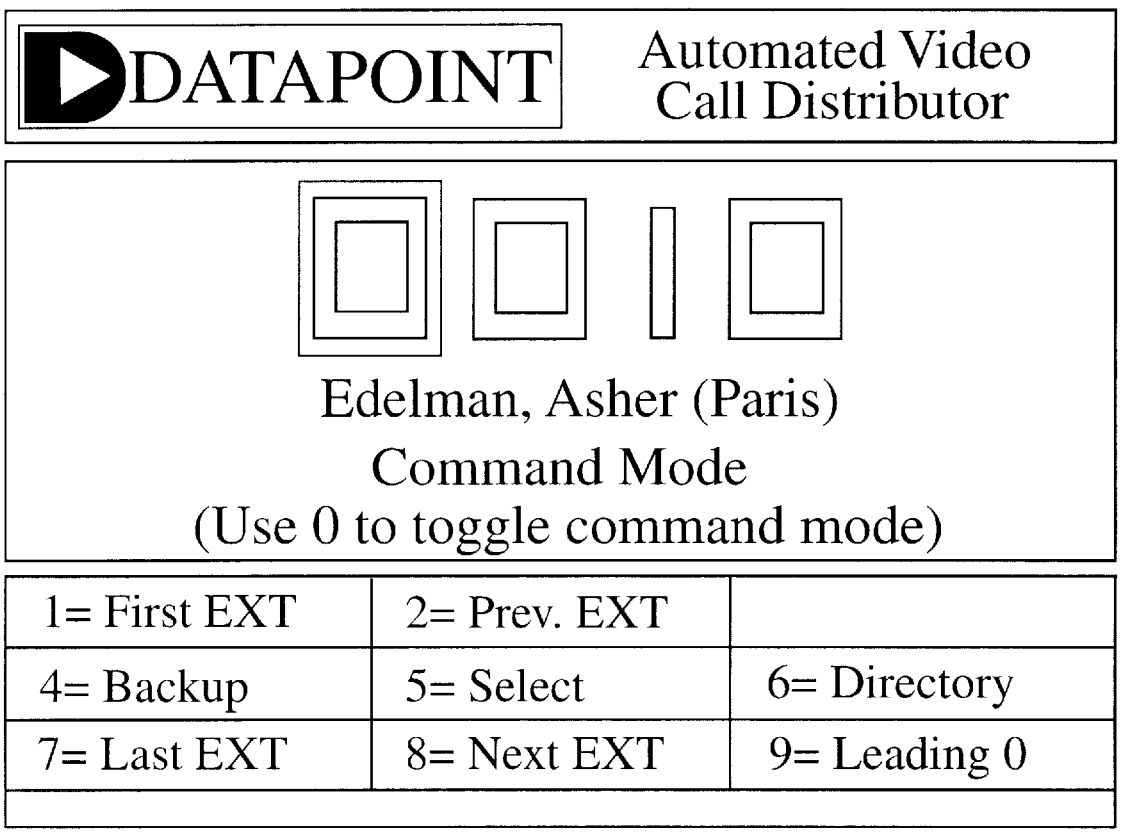
Figure 8B:
Figure 9:
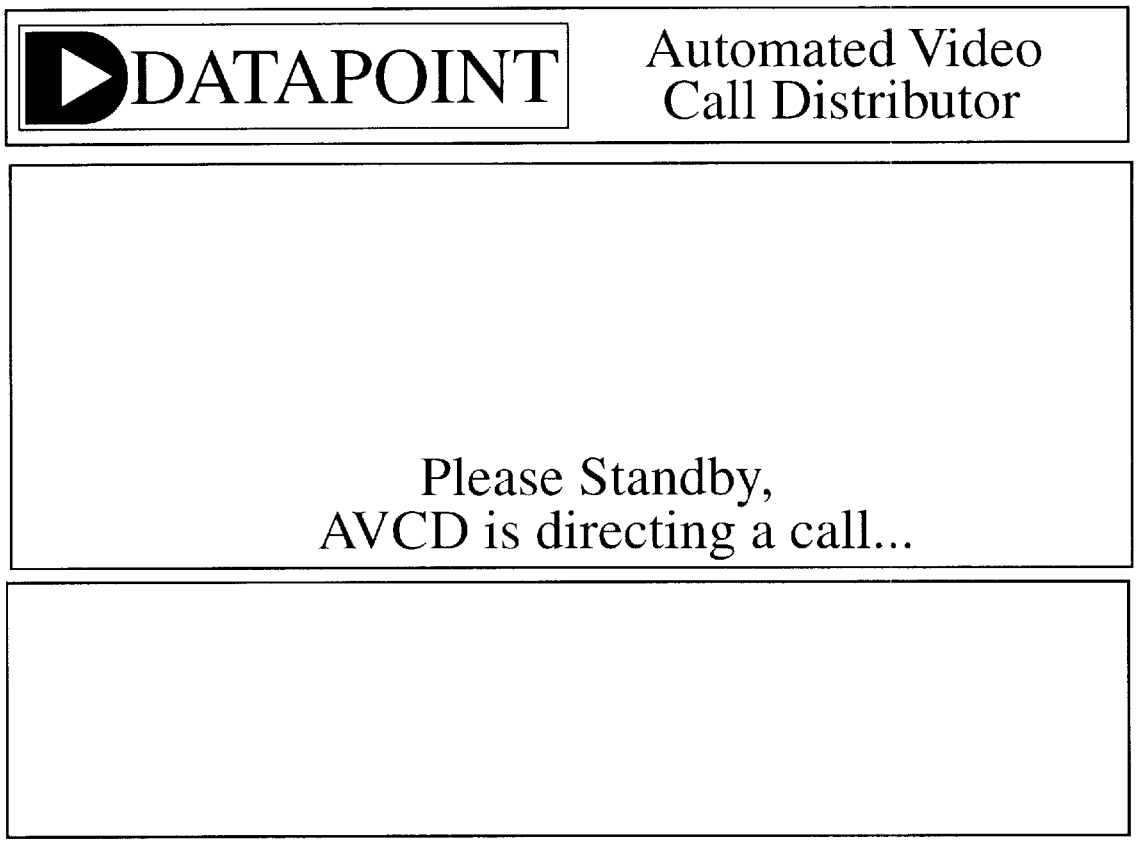

Director Lookup Method (See FIGS. 7, 8B)

On entry to this data entry screen (using the "6" key in the command mode of the Station Number Entry method), the client is shown the first four names (in alphabetical orderusing last name entry in the database). At this point, the client may use their keypad to spell out a name. The lower portion of the screen displays the keypad number corresponding to letters of the alphabet, using the same location as found on standard telephone equipment: 2=ABC, 3=DEF, 4=GHI, 5=JKL, 6=MNO, 7=PQRS, 8=TUV, 9=WXYZ (note: standard telephone equipment keypads do not label Q and Z on the 7 and 9 keys, respectively). The "1" key is used a backspace key.

Figure 11:
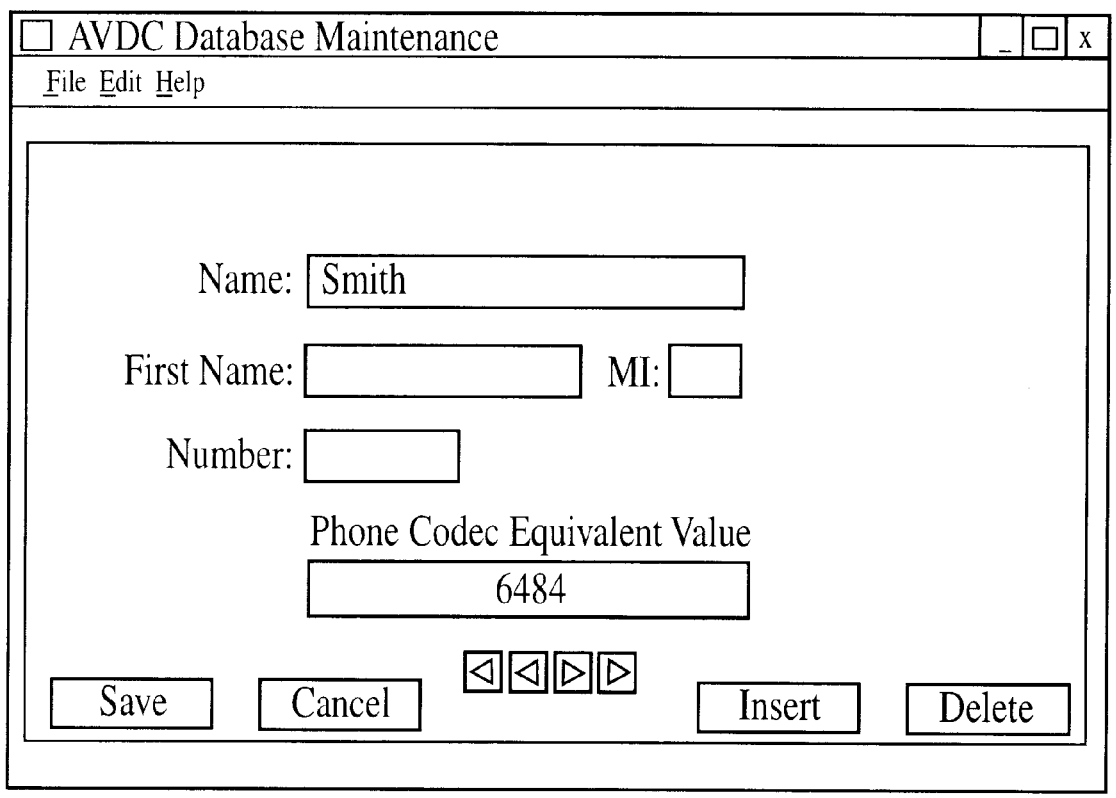
FIG. 11 is a screen display for database maintenance.

If the client does not know the name, or does not want to spell the name out, they may use the "0" key to toggle into command mode, at which time they can cursor through the database using the commands shown in the lower portion of the screen (See FIG. 8B):

1—Show first station name [Home]
7—Show last station name [End]
2—Show previous station name [Cursor Up]
8—Show next station name [Cursor Down]
4—Backup (like Backspace in data entry, except will return to Station Number Entry if no characters are in the lookup criteria spell buffer [Cursor Left]
6—Toggle data entry method (Initiates the Station number method) [Cursor Right]
3—Show previous four names [Page Up]
9—Show next four names [Page Down]
0—Command mode toggle
5—Dials the selected station name using station number shown Database Maintenance (See FIG. 11)

AVCD requires the station names and numbers to be contained in a Microsoft Access Database format file called DIRECTRY.MDB. An application called AVCD_DB.EXE is included to aid in creating and maintaining such a database; the user will be prompted if the database is not found, and given the opportunity to create one. Using this application, station names can be added, modified, deleted, or imported from a WinMINX dialing list, or compatible text file. If the database file does not exist, Setup will create the database with a single entry in it, namely the Operator at station number 0000.

The format of a WinMINX or compatible text file that can be imported with AVCD_DB is as follows:

LastNameOrDept, FirstName, MiddleInitial: StationNumber

Spaces, if any, that surround the delimiters, ",", and ":", will be trimmed during the import conversion process, and furthermore, only the last four digits of the StationNumber will be included in the AVCD database. Caution: a WinMINX file is an outgoing call list, not an incoming call list, and therefore may contain station numbers that should not be available to incoming callers. These numbers will most likely be greater than four digits, and should be deleted before or after the import conversion process, whichever may be easier.

When AVCD answers a call, it displays the first station number in the database (numerical order); therefore, it is suggested that one add the Operator using a station number of 0000, which will be automatically converted at dial time to the OperatorsStationNumber setting is defined in the AVCD.INI configuration file. If Setup creates the database, the Operator entry is added.

Customization

In the course of operation, AVCD identifies itself, and instructs the client in the operation of AVCD using both visual and audio prompting. Several audio and visual prompts are examples of what is possible with AVCD. The AVCD.INI configuration file allows the administrator of AVCD to customize any of the audio and visual prompting.

Headings

The heading area of the AVCD screen contains two objects: a title object on the right, and an image object on the left.

The title object is simply a text area that displays the title of this application, the default being "Automated Video Call distributor". This can be changed by editing the AVCD.INI configuration file and changing the Title item in the [AVCD] section.

The image object can contain any bitmat image, and will be resized to fit the rectangular image object. It may take a few attempts to create or find a bitmap that will resize appropriately; in other words, a square bitmap image for use in the logo image object would not be the ideal choice because it would be stretched disproportionally to fill the rectangular image object. The default logo is the Datapoint logo, and is specified by the "Logo=(default)" setting in the [AVCD] section of the AVCD.INI configuration file. To specify a new logo, simply specify a path to the desired logo, for example: "Logo=c:\images\company.bmp". To eliminate a logo from being displayed, set Logo to nothing, for example: "Logo=".

Audio Prompting

Audio prompting is used in various instances as outlined in the [Sounds] section of the AVCD.INI configuration file. If a new audio prompt is desired, a new WAV format audio file can be created. The method used to create such a WAV file is dependent on the sound card installed on the PC that will be recording the WAV file. A WAV file created on one machine can be used on another even if the PC playing the WAV file uses a sound card from a different manufacturer than the PC which recorded the WAV file; therefore, a replacement WAV file for AVCD could be recorded on any PC, and copied over to the AVCD PC.

Once a WAV file has been recorded using whatever quality desired (11 kzHz 8-bit Mono should be more than adequate), simply edit the AVCD.INI configuration file, and change the corresponding entry in the [Sounds] section. For example, if you wanted the welcome audio message to contain a company name other than Datapoint, you would record a new WAV file and save it into a file called something like MYWELCOM. WAV, and edit AVCD.INI to change "Welcome=WELCOME.WAV" to "Welcome=MYWELCOME.WAV". If the file resided in a different location than where AVCD.EXE application is located, then add the path to the file; for example: "Welcome=D:\WAVFILES\MYWELCOM.WAV".

Visual Prompting

Visual prompting is used in various instances as outlined in the [Messages] section of the AVCD.INI configuration file. If a new visual prompt is desired, simply edit the AVCD.INI configuration file and change the corresponding text to the desired wording. Messages can be up to two lines long, and are auto-centered in the blue information area in the center of the screen; some messages are displayed in place of a name when using the station number entry method. If it is desired to force certain text to be on line two of the information area, precede the text with a vertical bar. For example: "CommandMode=Command Model | (Use 0 to toggle command mode)" displays "Command Mode" centered on line 1, and "(Use 0 to toggle command mode)" centered on line 2. If the vertical bar was not used in this case, the text would automatically word wrap to the second line as appropriate.

Configuration File

Below are all the valid values contained in the AVCD.INI file with the default settings shown.

[PortMINX]

This section pertains to PortMINX.

CommPort=1

Specify the PC's Async Comm port for use by PortMINX. 1 for COM1, 2 for COM2, etc. Note: the comm values are pre-programmed to 9600 baud, no parity, 8 data bits, and 1 stop bit.

[AVCD]

This section pertains to the AVCD application.

Title=Automated Video Call Distributor

Text that displays to the right of the logo in the heading section of the screen (not the title bar)

Logo=(default)

BMP logo file to be displayed in the upper left corner of the AVCD screen. Setting this entry to "(default)" causes the default Datapoint logo to be used. Setting it to nothing, (i.e. "Logo="), to prevent any logo from being displayed. The logo will be stretched or reduced to fit the preallocated rectangular logo area.

CommPort=2

If using software DTMF detection as opposed to using an external hardware DTMF detection device, this value must be set to 0; otherwise, specify the PC's Async Comm port for use by AVCD to obtain the ASCII converted DTMF tones from the external DTMF detection device. Note: the comm values are pre-programmed to 9600 baud, no parity, 8 data bits, and 1 stop bit.

OperatorStationNumber=0000

Specify the station number of the operator. If a station number of 0000 is selected, it will be translated to the value specified here before dialing takes place.

DialOperatorOnTimeout=0

If set to 0, the operator will not be dialed when an input timeout occurs; instead, AVCD will hang up the line. If set to −1 (or any non-zero value), the operator (defined by OperatorStationNumber above) will be dialed when an input timeout occurs. An input timeout value is defined using the InputWaitSeconds entry shown below.

AllowBlindDialing=−1

If set to 0, the client will not be allowed to dial an unlisted station number (a station number that is not found in the database). If set to −1 (or any non-zero value), then the client will be able to dial an unlisted number (an indication that the number is not in the database will be displayed.

WelcomeDisplaySeconds=10

Specify the number of seconds to display the welcome screen before the welcome audio message is played.

InputWaitSeconds=30

Specify the number of seconds that AVCD will wait for input before it decides to hangup or dial the operator, depending on the DialOperatorOnTimeout setting shown above.

DialingMaxSeconds=30

Specify the number of seconds to wait for a dialing operation to complete before notifying the client that the station is not answering.

HangupMaxSeconds=2

Specify the number of seconds to wait for a hangup operation to complete.

PauseSeconds=2

Specify the number of seconds to wait between the displaying of multiple messages.

[Sounds]

This section pertains to sounds played by AVCD. Each entry should contain a path to a WAV format sound file to be played when a specific event occurs.

Welcome=WELCOME.WAV

WAV file welcoming the client to the AVCD system at connect time.

Example: "Welcome to Datapoint's Automated Video Call distribution System"

EnterStationNumber=ENTERNUM.WAV

WAV file prompting the client to key in a station number.

Example: "Please enter station number using keypad"

DirectoryLookup=DIRLOOK.WAV

WAV file prompting the client to use the keypad to spell out the desired station name.

Example: "Directory lookup, please enter last name using keypad"

DialingStation=DIALING.WAV

WAV file informing the client that AVCD is dialing the station number.

Example: "Dialing station, please wait"

DialingOperator=DIALOPER.WAV

WAV file informing the client that AVCD is dialing the operator.

Example: "Dialing operator, please wait"

Busy=BUSY.WAV

WAV file informing the client that the station dial was busy.

Example: "Station is busy, please try again later"

LineError=LINEERR.WAV

WAV file informing the client that a line error occurred; such as attempting to dial an invalid station number or there was a problem with the hardware.

Example: "Call cannot be completed, please try again later"

NoAnswer=NOANSWER.WAV

WAV file informing the client that the station number dialed did not answer within the time allocated by the DialingMaxSeconds setting.

Example: "Station called is not answering"

Goodbye=GOODBYE.WAV

WAV file thanking the client for using AVCD.

Example: "Thank you for using Datapoint's Automated Video Call Distribution System"

[Messages]

This section pertains to the messages displayed by AVCD. All messages are centered automatically and can be up to two lines long, except for InvalidStationNumber and StationNumberNotFound which can be only one line long. The number of characters per line is variable, and can only be determined by trial and error because the font used is a variable pitch font. Two line messages will auto wrap to the second line; however, an embedded vertical bar "|" will force the text following to appear on the next line.

WaitingForCall=Waiting for a call (See FIG. 4)

Specify the message to be displayed in the blue information area when AVCD is idle and waiting for an incoming call.

Figure 5:
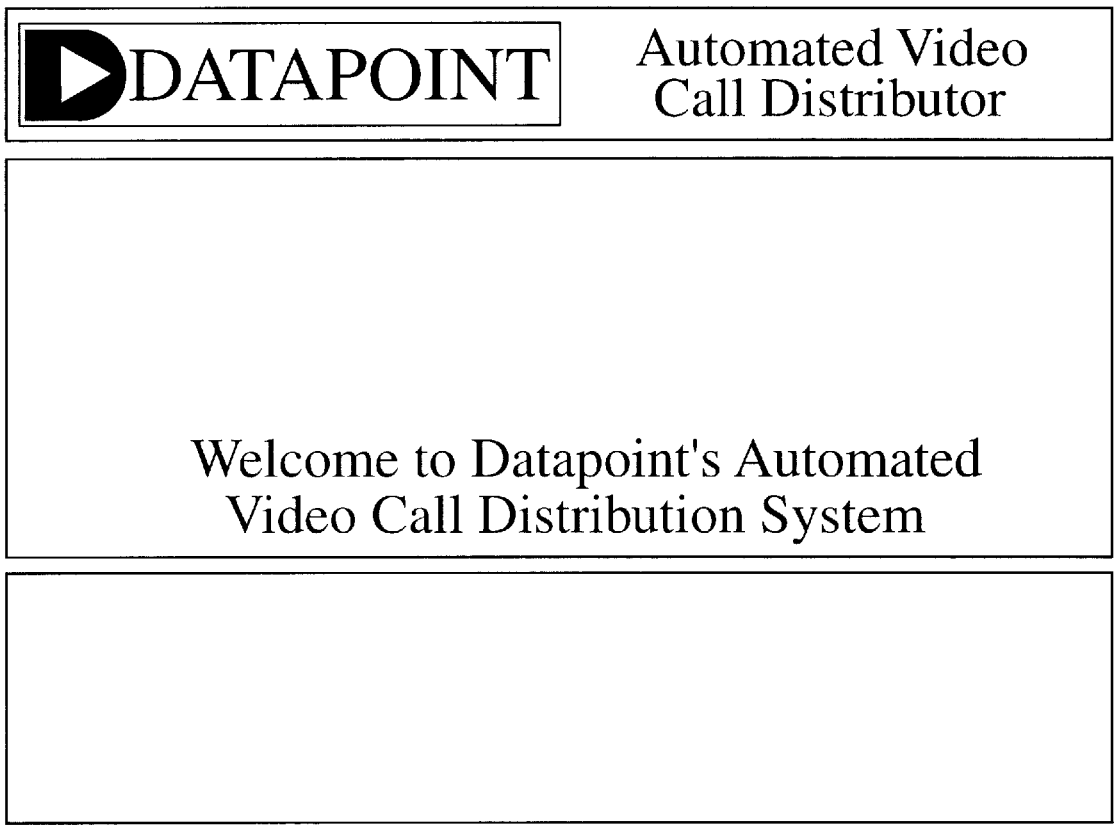

Welcome=Welcome to Datapoint's Automated/Video Call Distribution System (See FIG. 5)

Specify the message to be displayed in the blue information area when an incoming call has been answered.

Figure 6:
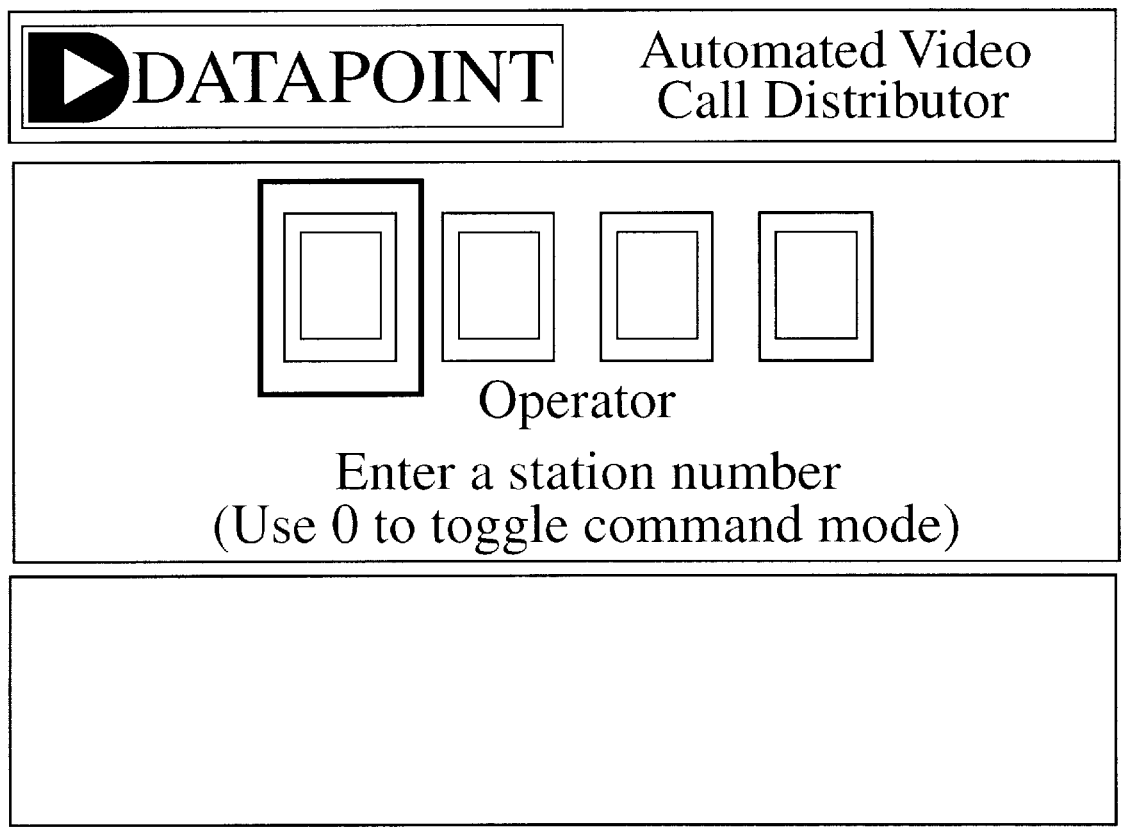

EnterStationNumber=Enter a station number/(Use 0 to toggle command mode) (See FIG. 6)

Specify the message to be displayed in the blue information area to prompt the client to use the keypad to enter a station number.

SpellLastName=Spell last name using the keypad/(Use 0 to toggle command mode) (See FIG. 7)

Specify the message to be displayed in the blue information area to prompt the client to use the keypad to spell out a station name.

CompleteStationNumber=Please complete station number

Specify the message to be displayed in the blue information area when the client has started entering a station number, and a command toggle using the 0 key is not available.

CommandMode=Command Mode/(Use 0 to toggle command mode (See FIGS. 8A, 8B)

Specify the message to be displayed in the blue information area when in command mode, such that the keypad is used to specify a command shown in the lower portion of the AVCD screen, as opposed to using the keypad to enter a station number or to spell out a station name.

DialingStation=Dialing Station, please wait . . .

Specify the message to be displayed in the blue information area when AVCD has initiated dialing of the selected station.

DialingOperator=Dialing Operator . . .

Specify the message to be displayed in the blue information area when AVCD has initiated dialing the operator.

GoodBye=Thank you for using | Datapoint's AVCD System

Specify the message to be displayed in the blue information area when AVCD is about to relinquish control of the call routing session.

StationBusy=Station is busy

Specify the message to be displayed in the blue information area when AVCD informs the client that the station dialed is busy.

NoAnswer=Station is not responding, | please try again

Specify the message to be displayed in the blue information area when AVCD informs the client that the station dialed is not responding, such as when the dialed station does not answer the call.

Standby=Please Standby, | AVCD is directing a call . . . (See FIG. 9)

Specify the message to be displayed in the blue information area to be shown during call routing so that the answering station can preview that AVCD is routing a call to them.

Shutdown=AVCD is shutting down . . .

Specify the message to be displayed in the blue information area when AVCD is terminating.

InvalidStationNumber= - - - Not a valid station number - - -

Specify the message to be displayed under the station number in place of the station name when the client has entered an invalid station number and AllowBlindDialing is set to 0 (not allowed).

Figure 10:
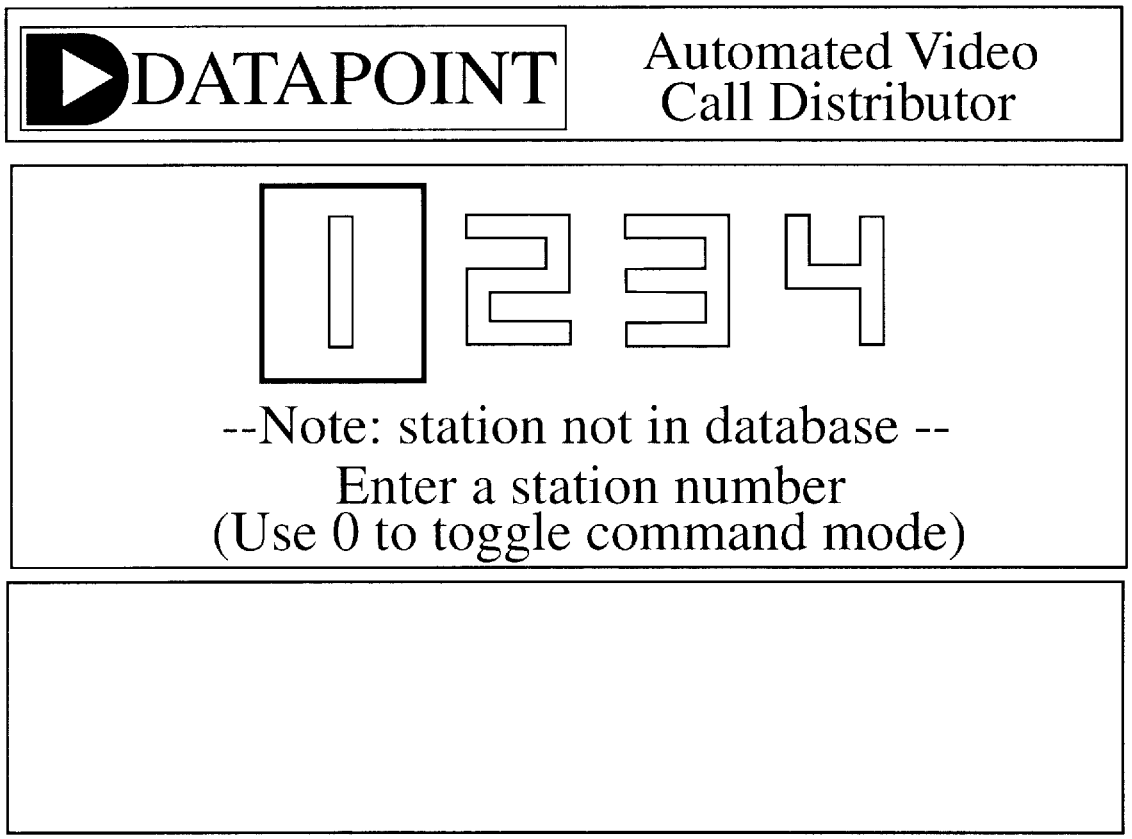

StationNumberNotFound= - - - Note: station not in database - - - (See FIG. 10)

Specify the message to be displayed under the station number in place of the station name when the client has entered an invalid station number and AllowBlindDialing is set to −1 (allowed).

What is claimed is:

1. A video call distribution apparatus, comprising:

a video conferencing network of video stations accessible for communication with each other;

at least one user communication station including an interface that generates dual tone modulated frequency (DTME) signals, each of said video conferencing network and said one user communication station having respective communication protocols;

a graphic user interface between the network and remote user communication station that generates real time continuous audio visual data output;

a video encoder that encodes the output of the graphic user interface into video signals;

a transmitter that transmits the video signals in real time to said remote user communication station, so as to produce a video display at the user communication station;

a DTMF converter that converts the DTMF signals to a designation that has a format compatible with the video conferencing network, the designation being indicative of a destination one of the video stations of the video conferencing network, the destination one of the video stations being responsive to the designation to connect with the user communication station;

a video switch; and a codec that determines whether the communication protocols of said video conferencing network and the user communication station are compatible and, if so, directly connects the video conferencing network with the user communications station, but if not, connects the user communication station with the video switch, the video switch being responsive to connection with the user communication station being established by the codec to transmit a prompt to the user communication station and, in response to a reply to the prompt from the user communication station, placing a call to an appropriate destination one of the video stations.

2. An apparatus as in claim 1, wherein the video switch is responsive to an answer from the destination one of the video stations to disconnect, leaving the user communication station and the destination one of the video stations in contact with each other.

3. A video call distribution apparatus, comprising:

a video conferencing network of video stations accessible for communication with each other;

at least one user communication station including a microphone interface that generates signals indicative of voice;

a graphic user interface between the network and remote user communication station that generates real time audio visual data output;

a video encoder that encodes the output of the graphic user interface into a video signal;

a transmitter that transmits the video signal in real time to said user communication station, so as to produce a video display at the user communication station;

a converter that converts voice into an electrical signal at the user communication station and transmits the same;

voice recognition software that receives the electrical signal and makes a recognition of the destination one of the video stations from the received electrical signal, the destination one of the video stations being responsive to the recognition of the destination by the voice recognition software to connect with the remote user communication station;

a video switch;

a codec that determines whether communication protocols of said video conferencing network and the remote user communication station are compatible and, if so, directly connects the video conferencing network with the remote user communication station, but if not, connects the user communication station with the video switch, the video switch being responsive to connection with the user communication station being established by the codec to transmit a prompt to the user communication station and, in response to a rely to the prompt from the user communication station, placing a call to an appropriate destination one of the video stations.

4. An apparatus as in claim 3, wherein the video switch is responsive to an answer from the destination one of the video stations to disconnect, leaving the user communication station and the destination one of the video stations in contact with each other.

5. A method of distributing a video call, comprising:

providing a plurality of video stations on a video conferencing network, the video stations communicating with each other;

determining whether communication protocols of the video conferencing network and a remote user communication station are compatible;

identifying a designation of a destination one of the video stations from the communication protocols provided the step of determining finds that the communication protocols are compatible with each other;

transmitting a prompt to the remote user communication station provided the step of determining finds that the communication protocols are incompatible with each other;

identifying the designation of a destination one of the video stations from the communication protocols in response to a reply from the prompt by the remote user communication station; and directly connecting the remote user communication station with the destination one of the video stations in accordance with the designation.

6. A method as in claim 5, further comprising generating real time audio visual data output with a graphic user interface between the video conferencing network and the remote user communication station;

encoding the output of the graphic user interface into a video signal;

transmitting the video signal in real time to said remote user communication station, so as to produce a video display at the remote user communication station; and generating dual tone modulated frequency (DTMF) signals with the remote user communication stations the step of making the identification including converting the DTMF signals into a designation having a format compatible with the video conferencing network, the designation being indicative of a destination one of the video stations of the video conferencing network, the step of directly connecting including connecting the remote user communication station with the destination one of the video stations based on the designation.

7. A method as in claim 5, further comprising:

generating real time audio visual data output with a graphic user interface between the video conferencing network and the remote user communication station;

encoding the output of the graphic user interface into a video signal;

transmitting the video signal in real time to said remote user communication station, so as to produce a video display at the remote user communication station;

converting voice into an electrical signal at the remote user communication station and transmitting the same; and receiving and processing the electrical signal with voice recognition software to recognize a designation of the destination one of the video stations, the steps of making an identification and directly connecting taking place by connecting the remote user communication station with the destination one of the video stations based on the recognition of the designation by the voice recognition software.

8. A method as in claim 6, further comprising the step of placing a call to the destination one of the video stations in accordance with the designation, answering the call with the destination one of the video stations, and, thereafter in response to the answering, establishing the connection between the remote user communication station and the destination one of the video stations.

9. A method as in claim 7, further comprising the step of placing a call to the destination one of the video stations in accordance with the designation, answering the call with the destination one of the video stations and, thereafter in response to the answering, establishing the connection between the remote user communication station and the destination one of the video stations.

10. An apparatus to distribute a video call, comprising:

a plurality of video stations on a video conferencing network, the video stations configured to communicate with each other;

a codec arranged and configured to determine whether communication protocols of the video conferencing network and a remote user communication station are compatible, the codec being configured to identify a designation of a destination one of the video stations from the communication protocols provided the communication protocols are determined to be compatible with each other; and a video switch being configured to transmit a prompt to the remote user communication station provided that the communication protocols are determined to be incompatible with each other, the video switch being configured to identify the designation of a destination one of the video stations in response to a reply from the prompt by the remote user communication station, one of the codec and the video switch being arranged to directly connect the remote user communication station with the destination one of the video stations in accordance with the designation that was identified.

* * * * *

UNITED STATES PATENT AND TRADEMARK OFFICE
CERTIFICATE OF CORRECTION

PATENT NO. : 5,903,302
DATED : May 11, 1999
INVENTOR(S) : Jeffrey D. Browning, et al.

It is certified that error appears in the above-identified patent and that said Letters Patent is hereby corrected as shown below:

In claim 1, col. 13, line 3, change "rely" to -- reply --.

Signed and Sealed this

Fourteenth Day of March, 2000

Attest:

Attesting Officer

Q. TODD DICKINSON

Commissioner of Patents and Trademarks